United States Patent [19]
Hill et al.

[11] Patent Number: 5,941,210
[45] Date of Patent: Aug. 24, 1999

[54] GASEOUS FUEL DIRECT INJECTION SYSTEM FOR INTERNAL COMBUSTION ENGINES

[75] Inventors: Raymond John Hill, Beldon; Steven Ross Ahern, Claremont, both of Australia

[73] Assignees: Orbital Engine Company (Australia) PTY Limited, Balcatta, Australia; Meteor, Tecumseh, Mich.

[21] Appl. No.: 08/699,594

[22] Filed: Aug. 19, 1996

[30] Foreign Application Priority Data

Aug. 18, 1995 [AU] Australia ................................ PN-4895

[51] Int. Cl.⁶ .............................. F02B 7/08; F02B 43/00; F02M 21/00
[52] U.S. Cl. ...................... 123/305; 123/298; 123/480; 123/527
[58] Field of Search ................................. 123/305, 73 C, 123/478, 357, 295, 339, 179 L, 480, 501, 527, 298

[56] References Cited

U.S. PATENT DOCUMENTS

| | | | |
|---|---|---|---|
| 4,306,526 | 12/1981 | Schaub et al. | 123/257 |
| 4,421,280 | 12/1983 | Lewis et al. | 239/132.5 |
| 4,430,978 | 2/1984 | Lewis et al. | 123/478 |
| 4,574,754 | 3/1986 | Rhoades, Jr. | 123/298 |
| 4,606,322 | 8/1986 | Reid et al. | 123/575 |
| 4,774,909 | 10/1988 | Dolderer | 123/1 A |
| 4,926,806 | 5/1990 | Ahern et al. | 123/179 L |
| 4,949,689 | 8/1990 | Schlunke | 123/295 |
| 5,031,594 | 7/1991 | Morikawa | 123/339 |
| 5,052,360 | 10/1991 | Ingle, III et al. | 123/430 |
| 5,067,467 | 11/1991 | Hill et al. | 123/497 |
| 5,076,244 | 12/1991 | Donaldson | 123/527 |
| 5,190,006 | 3/1993 | Motoyama et al. | 123/305 |
| 5,205,254 | 4/1993 | Ito et al. | 123/305 |
| 5,322,044 | 6/1994 | Maebashi | 123/305 |
| 5,329,908 | 7/1994 | Tarr et al. | 123/527 |
| 5,394,852 | 3/1995 | McAlister | 123/49 L |
| 5,623,909 | 4/1997 | Wertheimer | 123/501 |

FOREIGN PATENT DOCUMENTS

| | | |
|---|---|---|
| 0 159 429 | 10/1985 | European Pat. Off. ............... 123/305 |
| 0 320 959 | 6/1989 | European Pat. Off. ............... 123/305 |
| 0 417 795 | 3/1991 | European Pat. Off. . |
| 0 480 545 | 4/1992 | European Pat. Off. ............... 123/305 |
| 0 520 659 | 12/1992 | European Pat. Off. ............... 123/305 |
| 2 221 722 | 8/1989 | United Kingdom . |
| 2 233 388 | 6/1990 | United Kingdom . |
| 93/23662 | 11/1993 | WIPO ................................... 123/305 |

OTHER PUBLICATIONS

Patent Abstracts of Japan, vol. 095, No. 009, Oct. 31, 1995 & JP 07 166873 A (Nippon Clean Engine Lab Co., Ltd.), Jun. 27, 1995.
Patent Abstracts of Japan, vol. 010, No. 029 (M–451), Feb. 5, 1986 & JP 60 184937 A (Kawasaki Jukogyo KK), Sep. 20, 1985.
Patent Abstracts of Japan, vol. 013, No. 077 (M–801), Feb. 22, 1989 & JP 63 277847 A (Mitsubishi Heavy Ind., Ltd.), Nov. 15, 1988.

*Primary Examiner*—Henry C. Yuen
*Assistant Examiner*—Hieu T. Vo
*Attorney, Agent, or Firm*—Nikaido, Marmelstein, Murray & Oram LLP

[57] ABSTRACT

A gaseous fuel direct injection fuel system for a spark ignited internal combustion engine having an inlet port for admitting combustion air into a combustion chamber of the engine, the direction injection system including at least one fuel injector for directly injecting gaseous fuel into the combustion chamber, and means for supplying gaseous fuel to the fuel injector, a quantity of gaseous fuel being injected into the combustion chamber by the fuel injector, wherein at least at some operating condition thereof, the injection of the gaseous fuel is initiated after the closing of the inlet port, and wherein the injection of the gaseous fuel is completed before the compression stroke of the engine is substantially completed.

35 Claims, 4 Drawing Sheets

GASEOUS FUEL DIRECT INJECTION SYSTEM FOR INTERNAL COMBUSTION ENGINES

BACKGROUND OF THE INVENTION

1. Field of the Invention

The present invention relates to direct injected internal combustion engines using gaseous fuels.

2. Description of the Related Art

The term "direct injected" refers to the use of fuel injectors for injecting fuel directly into the combustion chambers of internal combustion engines. The term "gaseous fuel" is defined herein as referring to both compressed gas fuel such as compressed natural gas (CNG) or hydrogen ($H_2$) and liquefied gas fuels such as liquefied petroleum gas (LPG).

There are numerous potential advantages in using gaseous fuels in engines in place of the more commonly used liquid fuels. For example, it is well appreciated that the undesirable exhaust emissions from an engine using a gaseous fuel can be lower than for a comparable engine using liquid fuel. Further, at the present time, the use of certain gaseous fuels can translate to a significant cost saving for the user due to the per liter cost thereof as compared to the per liter cost of the commonly used liquid fuels.

The applicant has developed certain spark ignited, direct injection two stroke and four stroke cycle internal combustion engine technologies which primarily use liquid fuel. It would however be advantageous to also have a system which can inject gaseous fuel directly into the combustion chambers of the engine as this may lead to a simpler system requiring less mechanical components as well as preferably facilitating more accurate metering control of the gaseous fuel to the engine as compared with prior art systems.

Although diesel engines generally use direct injection fuel systems and certain diesel engines which use gaseous fuels are known, the operating environment within which these fuel systems must operate are significantly different to those encountered within a spark ignition engine. For example, modern spark ignition engines typically operate at significantly higher engine speeds than for corresponding diesel engines. This therefore provides a more demanding environment for a direct injection fuel system and the control system therefor when used in a spark ignition engine.

Furthermore, reasonably accurate control of the fuel distribution within the combustion chamber is required in a spark ignition engine to ensure that there is a combustible mixture present immediately adjacent the spark plug at the appropriate time during each engine operating cycle. In the compression ignition operation of a diesel engine, such accurate fuel distribution control is not as critical.

It is therefore an object of the present invention to provide a system for the direct injection of gaseous fuel into a spark ignited internal combustion engine.

It is also an object of the present invention to provide a method of controlling a gaseous fuel direct injection system for a spark ignited internal combustion engine.

SUMMARY OF THE INVENTION

With this in mind, the present invention provides in one aspect a gaseous fuel direct injection fuel system for a spark ignited internal combustion engine having an inlet port for admitting combustion air into a combustion chamber of the engine, the direction injection system including at least one fuel injector for directly injecting gaseous fuel into the combustion chamber, and means for supplying gaseous fuel to the fuel injector, a quantity of gaseous fuel being injected into the combustion chamber by the fuel injector, wherein at least at some operating conditions thereof, the injection of the gaseous fuel is initiated after the closing of the inlet port, and wherein the injection of the gaseous fuel is completed before the compression stroke of the engine is substantially completed.

According to another aspect of the present invention, there is provided a method for controlling a gaseous fuel direct injection system for a spark ignited internal combustion engine having an inlet port for admitting combustion air into a combustion chamber of the engine, the direct injection system having at least one fuel injector for directly injecting gaseous fuel into the combustion chamber, and means for supplying gaseous fuel to the fuel injector, a quantity of gaseous fuel being injected into the combustion chamber by the fuel injector, the method including initiating the injection of gaseous fuel after the closing of the inlet port and completing the injection of gaseous fuel before the compression stroke of the engine is substantially completed at least at some points when the engine is operating below a maximum load operating condition thereof.

Preferably, the fuel injector may meter the quantity of gaseous fuel delivered to the combustion chamber. The quantity of gaseous fuel delivered may be a function of the duration of opening of the fuel injector.

The system may also include a control means for controlling the operation of the fuel injector. The control means may control the duration of injection, being the period for which the fuel injector is opened, and the starting point and/or the end point for the injection duration. In one arrangement, the control means may control the operation of the fuel injector as a function of the operator load demand, this being the engine load demanded by the operator of the engine. For example, in the case of an engine within a vehicle, the load demand may be controlled by the vehicle driver by displacement of an accelerator pedal and may be in response to the operator's desire to, for example, overtake a slow moving vehicle or ascend a steep incline. The control means may determine the operator load demand as a basis for determining the required operating parameters for the fuel injector, and may control the operation of the fuel injector accordingly. To this end, the control means may include at least one "look-up" map to determine the required operating parameters for the fuel injector.

According to yet another aspect of the present invention, there is provided a gaseous fuel direct injection fuel system for a spark ignited internal combustion engine, the direct injection system including at least one fuel injector of directly injecting gaseous fuel into the combustion chamber, control means being provided to control fuelling level to the engine on the basis of operator demand, said operator demand being provided as a speed demand value.

In this arrangement, the control means may control the operation of the fuel injector as a function of the operator speed demand, being the engine speed demanded by the operator of the engine. This may similarly be controlled by the accelerator pedal, 60 in FIG. 5, in the case of an engine within a vehicle. The fuel injector may be controlled according to a closed loop speed control strategy wherein the operation of the fuel injector is controlled as a function of at least the difference between an operator speed demand signal and the actual engine speed, the engine speed being used as a feedback signal to the control means.

The output signal of the control means which controls the operation of the fuel injector may preferably be a function of the magnitude of the difference between the operator speed demand and the actual engine speed, wherein an increase in the difference results in an increase in the change of the control parameters of the fuel injector. For example, if the operator speed demand is significantly higher than the actual engine speed at that time, the control means may adjust the operating parameters of the fuel injector to thereby significantly increase the fuelling rate to the engine.

The output of the control means may alternatively or in addition be a function of the magnitude of the rate of change of the operator speed demand wherein an increase in the rate of change results in an increase in the rate of change of the injector control parameters. For example, if the operator speed demand increases at a rapid rate, the control means may also adjust the operating parameters of the fuel injector at a greater rate thereof in order to significantly increase the fuelling rate to the engine.

The control means preferably controls the operation of the fuel injector such that the differential pressure across the fuel injector, being the difference between the supply pressure of the gaseous fuel being injected by the fuel injector and the pressure within the combustion chamber during the injection process, may be controlled. The fuel injector operation may be controlled to provide for a substantial difference in the differential pressure across the fuel injector between at least two different operating conditions of the engine.

The control means preferably controls the quantity of gaseous fuel delivered to the combustion chamber by altering the time at which the fuel injector begins to close relative to the cycle of engine operation or "engine cycle". During at least some engine operating conditions, a change in the operator load demand or operator speed demand may change the point in the engine cycle at which the fuel injector is initially opened or the point at which the fuel injector is finally closed, the total duration for which the fuel injector is open however preferably remaining substantially constant.

During at lest some engine operating conditions, the fuel injector completes the injection process after the pressure in the combustion chamber has begun to rise significantly, being at least after the inlet and exhaust ports of the combustion chamber have closed. It is however also envisaged that at other engine operating conditions, the point at which the fuel injector completes the injection process may be prior to any significant increase in the pressure within the combustion chamber. This enables the differential pressure across the fuel injector at the completion of the injection process to be varied.

The injection process may preferably be limited to the engine cycle period between 180° BTDC and 45° BTDC.

It should be noted that the pressure differential across the fuel injector at the final closing of the fuel injector is relatively more sensitive to changes in the engine operating parameters and conditions than at the initial opening of the fuel injector. This is in part due to the difference in the rate of the change in the cylinder pressure at different points in the engine cycle. The rate of change of the increase in the cylinder pressure early in the engine cycle shortly after the piston has passed bottom dead centre (BDC) is typically less than the rate of change of the increase in the cylinder pressure later in the engine cycle as the piston approaches top dead centre (TDC). The opening of the fuel injector generally occurs early in the engine cycle, with the closing of the fuel injector generally occurring later in the engine cycle. Therefore, variations in the closing time of the fuel injector has a greater effect on the differential pressure across the fuel injector than variations in the opening time of the fuel injector.

According to a further aspect of the present invention, there is provided a gaseous fuel direct injection fuel system for a spark ignited internal combustion engine, the direct injection system including at least one fuel injector for supplying gaseous fuel to the fuel injector, a quantity of gaseous fuel being injected into the combustion chamber by opening the fuel injector for a predetermined period of time, wherein at least at some operating condition thereof, the duration of the injection period is substantially fixed in the time domain and is not altered by a given change in engine speed.

During engine operating conditions at least when the engine is at idle, the point at which the fuel injector is initially opened may be set at a predetermined point in the engine cycle, with the duration for which the fuel injector is open being maintained at least substantially constant such that the closing of the fuel injector occurs after the pressure within the combustion chamber has begun to increase significantly, being at least after the inlet and outlet ports are closed. The advantage of this arrangement is that as the engine speed decreases, the pressure within the combustion chamber at the time the fuel injector closes decreases, since the engine has completed less of its compression stroke in a given time, thereby resulting in a higher differential pressure across the fuel injector. As the fuel delivered to the combustion chamber is a function of the differential pressure, more fuel is delivered under these conditions in a given amount of time resulting in an increase in torque as the engine speed decreases. This so called "torque back-up" assists the engine when the engine needs to accelerate, at least from idle, and also assists in maintaining a constant idle speed.

The direct injection system may include a fuel supply means for storing and supplying the gaseous fuel. In one arrangement, the pressure of the gaseous fuel supplied by the fuel supply means may be unregulated. To this end, the control means may respond to changes in the pressure of the gaseous fuel within the fuel supply means, wherein changes in the pressure of the gas in the fuel supply means may result in variations of the operational parameters of the injector. In this regard, a pressure measurement device may be provided in the fuel supply system.

The control means preferably senses the delay time between the sending of a signal from the control means to the fuel injector to open the fuel injector and the actual sensed opening time of the injector. The delay time may be used as a parameter in controlling the duration for which the fuel injector is held open and for enabling the determination of the gaseous fuel pressure at the fuel injector. This is based on the principle that the delay time will be different when the differential pressure across the injector is different. For example, in a poppet type injector valve, the higher the differential pressure, the shorter the delay time. This arrangement allows the control means to compensate for the variations in the rate of delivery of gaseous fuel from the fuel injector as the fuel injector is opening, the rate of delivery of gaseous fuels when the fuel injector is not fully open being less than when the fuel injector is fully open.

The fuel injector may preferably be solenoid actuated and the control means may sense the change in the current or voltage drawn by the injector to thereby determine the delay time, also known as the "turn-on" time for the fuel injector.

The control means may operate the engine such that a stratified gaseous fuel charge is present in the combustion chamber prior to ignition. One way that the stratified charge may be achieved is described in the applicant's earlier Australian Patent No. 592990, corresponding to U.S. Pat. No. 4,920,932 and will not herein be described in detail.

The fuel injector may include at least one contact area wherein at least one of a lubricant and a cleaning additive may be supplied to the at least one contact area. The fuel injector may include a valve head and a valve seat, the valve head being sealingly engaged with the valve seat when the fuel injector is in a closed position, wherein at least one of the lubricant and the cleaning additive may be supplied to the contact area between the valve head and the valve seat. Because the gaseous fuel is "dry", the potential for frictional wear of the valve head and valve seat is higher than in the case with liquid fuels which provide some lubricating effect on the contact area. Some lubrication may therefore be required for the contact area to minimise or prevent this wear. Furthermore, the cleaning additive will help to remove any deposit build-up on contact areas, particularly between the valve seat and valve member.

The fuel injector can be an outwardly opening poppet type injector having a poppet valve. The valve head of the poppet valve may have an outwardly diverging shape, and the valve seat may have a surface which co-operates with the shape of the valve head to thereby provide a sealing engagement therebetween. The valve head may for example be generally hemispherical in shape. The valve head may be actuated by an electrical solenoid, 61 in FIG. 5, assembly having an armature moveable between defined end stops. The impact area between the armature and the end stops may also or alternatively be lubricated. Commonly, one of the end stops may be the contact area between the valve head and the valve seat. The lubricant may preferably be supplied to the gaseous fuel upstream of the fuel injector.

The fuel supply means may preferably include a flow control valve to control the fuel supply to the fuel injector, the flow control valve preferably being operated by an actuating means. The flow control valve may be moveable between an open position wherein gaseous fuel is supplied to the fuel injector, and a closed position wherein the flow of gaseous fuel to the fuel injector is to be prevented. The flow control valve may be in the closed position when the engine is not operating. The flow control valve may preferably also incorporate a lubricant supply means which uses said actuating means to operate a lubricant pumping means. The actuating means may be of the electro-mechanical solenoid type. In an alternative arrangement, the actuating means may be a pressure responsive member. For example, the actuating means may be a pneumatic actuator.

The lubricant supply means preferably provides a metered quantity of lubricant to the fuel injector. The actuation of the lubricant pumping means may occur coincidentally with the flow control valve moving to the opened position. The actuation of the lubricant pumping means and the subsequent delivery of lubricant may be at a rate so as not to produce a noticeable interruption of the flow of gaseous fuel to the fuel injector.

In an alternative arrangement, the gaseous fuel may be delivered to the fuel injector at a relatively constant pressure. To this end, the flow control valve may regulate the gaseous fuel pressure. The regulated gaseous fuel pressure may preferably be between 380 kPa and 1.2 MPa. In particular, the regulated gaseous fuel pressure may be about 450 kPa.

The fuel supply means may also include a fuel tank, the pressure within the fuel tank being the vapour pressure of the gaseous fuel. The fuel tank preferably stores the gaseous fuel in a liquefied state with at least a portion of the gaseous fuel being stored in a gaseous state above the liquid fuel. The gaseous fuel supplied to the fuel injector via the fuel supply means may preferably be at the vapour pressure of the gaseous fuel. The fuel can be liquefied petroleum gas (LPG). Other gaseous fuels such as compressed natural gas (CNG) could alternatively be used.

The gaseous fuel within the fuel tank may be selectively heated to increase the vapour pressure of the gaseous fuel contained therein. To this end, the heating of the gaseous fuel may be at least partially achieved by heating the walls of the fuel tank by thermal contact with exhaust gases or the coolant of the engine. Any other engine waste heat may also be used to heat the walls of the tank.

The fuel tank may be a conventional pressure vessel being for example spherical or cylindrical in shape and having domed or flat ends. It is however preferable that the surface to volume ration of the fuel tank be greater than that for conventionally shaped pressure vessels with the walls of the fuel tank acting as a heat exchanger surface for heating the gaseous fuel. In a preferred arrangement, the fuel tank may include means, such as for example, external fins, to maximise the surface to volume ratio of the fuel tank. The provision of fins on the tank will assist in the heating of the gaseous fuel within the fuel tank.

In an alternative arrangement, an auxiliary storage, 64 in FIG. 5, means connected to the fuel tank may be provided. The auxiliary storage means may be smaller in volume than the fuel tank, and may be heated to generate the increased vapour pressure. The auxiliary storage means effectively provides an external heat exchanger for heating the liquid fuel in the fuel tank. A fuel pump means may be required to pump liquid fuel from the fuel tank to the auxiliary storage means because of the higher pressure therein. The advantage of heating a smaller auxiliary storage means is that there will be a lower thermal inertia than if the larger fuel tank is to be heated. This results in faster heating of the gaseous fuel. This is particularly advantageous in cold ambient operating conditions and particularly on start-up of the engine.

The fuel supply means may also include connection means, 63 in FIG. 5 connecting the fuel tank to the fuel injectors. The fuel tank and the connection means may be positioned such that intake air to the engine may also or alternatively heat the gaseous fuel within the fuel tank and/or the connection means (65 in FIG. 5). This will help to cool the intake air which helps to increase the power output of the engine.

During at least some engine operating conditions, the starting sequence of the engine may be achieved by the firing of at least one of the combustion chambers of the engine and does not rely on imparting initial motion to the reciprocating parts of the engine such as pistons by a separate mechanical means. To this end, the control means may select at least one combustion chamber for initial firing thereof, wherein the fuel injector in the combustion chamber is opened in a predetermined manner, and the spark plug in that combustion chamber is fired in a predetermined manner so as to cause the piston to travel through at least a part of its power stroke.

Because the gaseous fuel may be stored under very high pressure conditions, particularly in the case of CNG, it is envisaged that the regulation process for reducing the gaseous fuel pressure could provide useful work for the operation of the engine. For example, a turbine means, 67 in FIG. 5, such as a turbocharger could be run by the gas flow. Thus, the fuel pressure is throttled and regulated whilst providing useful work to the engine.

The gaseous fuel direct injection system may form part of a hybrid fuel system. In particular, the hybrid fuel system may operate with gaseous fuel at certain operating periods while operating with liquid fuel, 68 and 69 in FIG. 5, at other operating periods.

The gaseous fuel direct injections system may, for example, incorporate the applicant's engine fuel injection system as shown in Australian Patent No. 621820, corresponding to U.S. Pat. No. 4,934,829. This system may therefore also include an air compressor or an external air supply source as well as a liquid fuel supply source. Alternatively, the gaseous fuel direct injection system may incorporate the applicant's small engine fuel injections system as shown in international application no. PCT/AU94/00210 which utilises an accumulator chamber for collecting gas from the combustion chamber for the next injection process. In both of the above arrangements, the control system of the fuel injection system can be set to modify the control parameters such as the opening and closing time of the fuel injectors, the injection duration, the ignition timing and so on in dependence on the fuel being delivered.

The internal combustion engine may preferably operate on a two stroke cycle. To this end, the engine may conveniently operate with piston control inlet and exhaust ports.

BRIEF DESCRIPTION OF THE DRAWINGS

The present invention will be more readily understood from the following description of one practical arrangement of the gaseous fuel direct injection system of the present invention as illustrated in the accompanying drawings wherein.

DETAILED DESCRIPTION OF THE INVENTION

The gaseous fuel direct injection system will, in the main, be described in conjunction with a two stroke cycle, spark ignited internal combustion engine. The system is however also applicable to four stroke engines.

Figure 1:
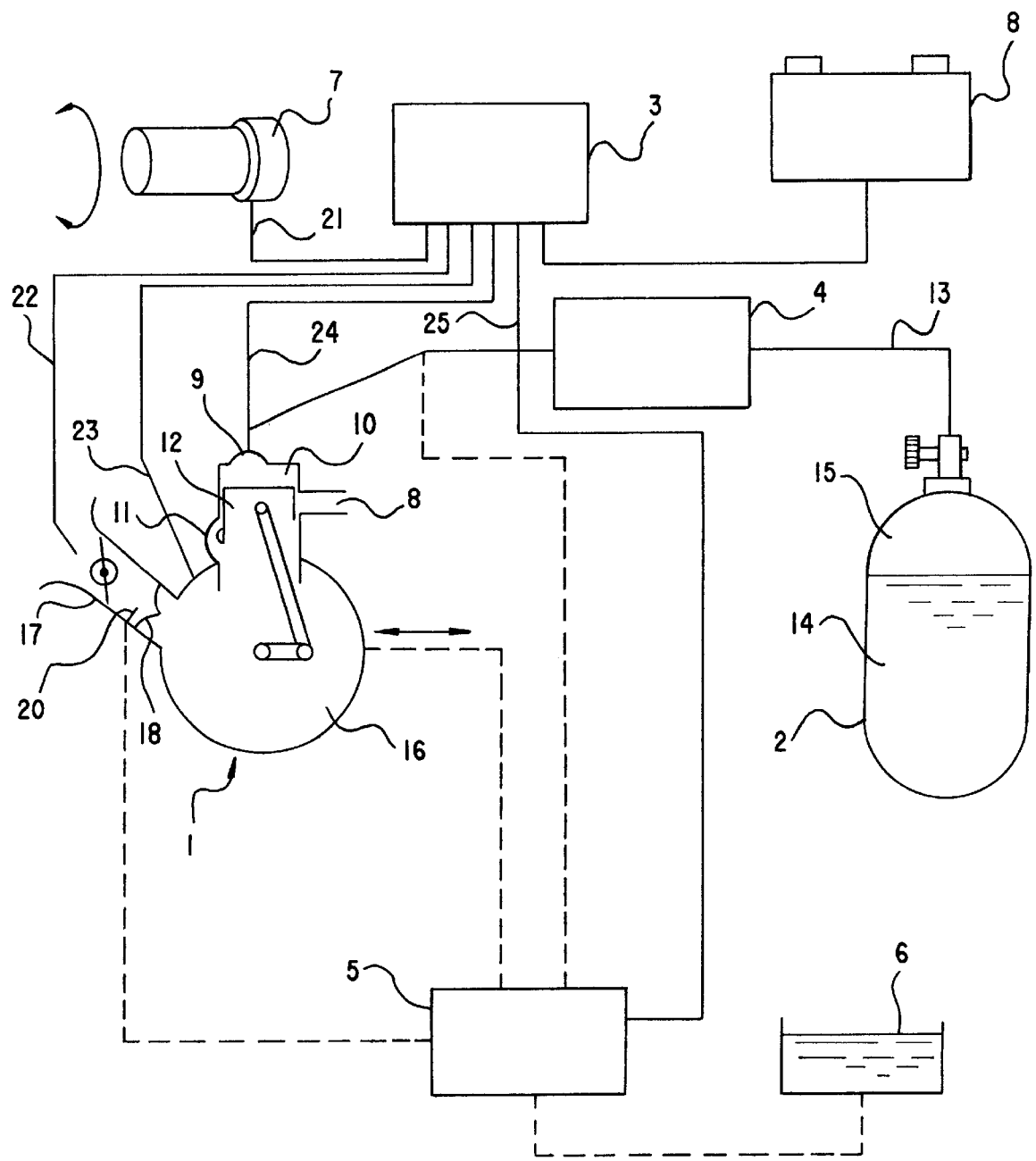
FIG. 1 is a schematic view of a gaseous fuel direct injection system according to the present invention used on a two stroke internal combustion engine.

Referring initially to FIG. 1, the system supplies gaseous fuel to a two stroke internal combustion engine 1 which includes at least one cylinder having a combustion chamber 10, an inlet port 11, and exhaust port 8 and a piston 12 for controlling the opening and closing of the inlet port 11 and the exhaust port 8. Gaseous fuel is delivered into the combustion chamber 10 by a fuel injector 9. The gaseous fuel can, for example, be LPG which is stored in a fuel tank 2. A portion 14 of the LPG is stored in the fuel tank 2 in a liquefied state whilst a gaseous portion 15 of the LPG is stored above the liquefied portion 14 thereof. The fuel tank 2 is connected to the fuel injector 9 by a fuel supply line 13. A pressure regulator 4 is provided along the fuel line 13 to regulate the supply pressure of the gaseous fuel to the fuel injector 9.

A lubrication system is also provided for the engine 1, this system including an oil tank 6 for storing the lubricating oil, and an oil pump 5. The oil pump 5 may be of any convenient type such as an electro-pneumatic type or, for example, may be actuated by the crankcase pressure within the crankcase 16 of the engine 1. Lubricating oil is pumped by the oil pump 5 to an oil nipple 20 located in the air intake 17 of the engine 1 upstream of the air intake valve 18. The oil pump 5 also supplies lubricating oil to the fuel supply line 13 upstream of the fuel injector 9 to thereby lubricate the fuel injector 9. Because the gaseous fuel is supplied in a dry gaseous state to the fuel injector 9, lubricating oil is required to lubricate the injector 9, in particular at the impact surfaces of the valve head and the valve seat thereof.

The operation of the fuel injector 9 is controlled by an electronic control unit 3 powered by a separate electrical power supply 8. The electronic control unit 3 can control the duration of the opening period of the fuel injector 9 as well as the point at which the fuel injector 9 is opened and closed during an engine cycle. The electronic control unit 3 obtains input signals from various sensors providing information of the operating conditions of the engine 1 as well as the driver demand and outputs control signals to certain engine components. The driver demand can be determined either as a load demand or a speed demand depending on the control strategy used. For example, a determination of the driver demand may be obtained from a throttle position sensor 7 which provides a demand input signal 21 to the electronic control unit 3. Numerous other sensors are used to provide information to the electronic control unit 3 on the operating conditions of the engine 1. For example, the electronic control unit 3 receives input signals relating to the air temperature 22 and the engine speed 23. The electronic control unit 3 may also receive other inputs such as crankshaft position inputs (eg; TDC pulses) depending upon the particular engine application or configuration. Conversely, the electronic control unit 3 outputs control signals to, for example, the electronic driver of the fuel injector 24 and the electronic driver of the oil pump 25.

Figure 2:
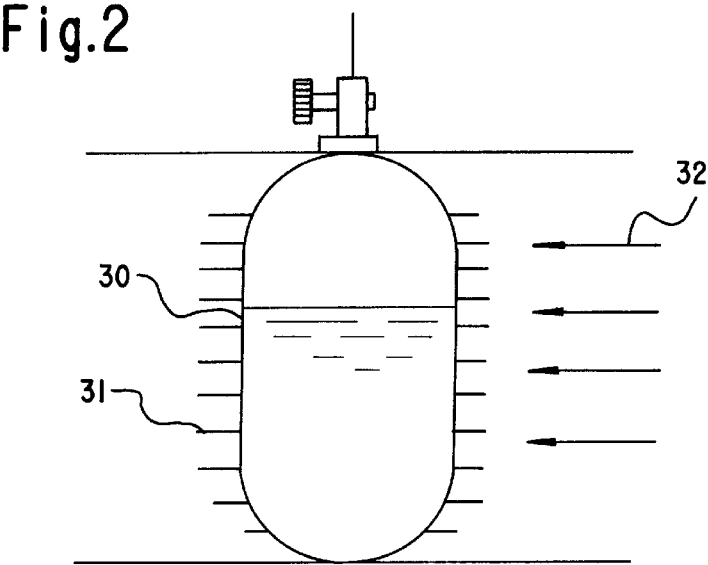
FIG. 2 is an alternative embodiment of the fuel tank according to the present invention.

Referring to FIG. 2, a second embodiment of the fuel tank 2 shown in FIG. 1 is shown, this fuel tank 30 including a plurality of external fins 31. The fuel tank 30 is exposed to waste heat 32 from the engine 1 such as from the exhaust gases from the engine to thereby heat the liquefied fuel within the tank 30 to increase the vapour pressure of the gaseous fuel therein.

Figure 3:
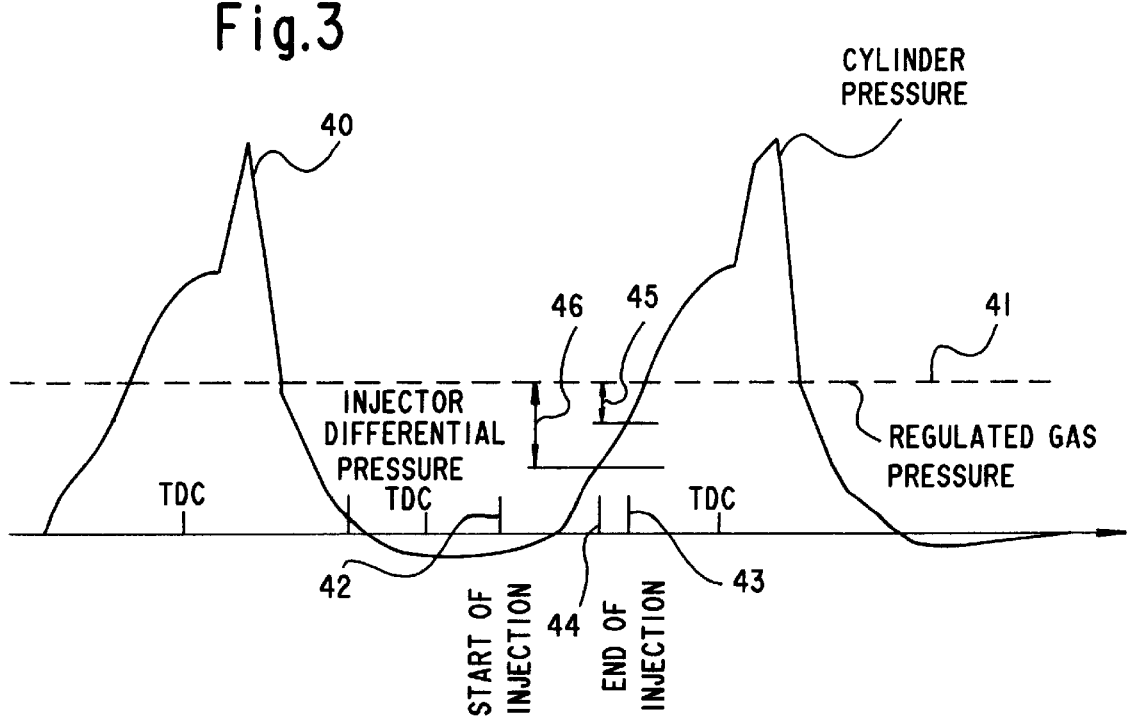
FIG. 3 is a graphical representation of the injection timing of a fuel injector of the system as shown in FIG. 1.

FIG. 3 shows how the differential pressure across the fuel injector 9 is controlled by retarding the end of the injection process while the start of the injection process is set at a predetermined point 42 in the engine cycle. The cylinder pressure 40 varies as a function of the position of the piston 12 within the cylinder peaking just after ignition occurs when the piston has just passed top dead centre (TDC) and being at a minimum when the piston is adjacent the bottom dead centre (BDC) position thereof. The pressure of the gaseous fuel supplied from the fuel tank 2, 30 is regulated such that the gaseous fuel supplied to the fuel injector 9 is at a constant pressure. This gas pressure 41 is therefore at least substantially constant throughout the engine cycle. FIG. 3 shows that the differential pressure across the injector 9 decreases as the end point of the injection process is retarded from point 44 to point 43 in the engine cycle, the differential pressure 45 at point 43 being less than the differential pressure 46 at point 44. The drop in differential pressure results in a corresponding drop in the quantity of fuel delivered by the fuel injector 9 during an engine cycle. The quantity of fuel injected by the fuel injector 9 may therefore, for example, be controlled by controlling the timing of the end of the injection process.

Alternatively, the fuel quantity injected by the fuel injector 9 can be varied by maintaining the duration of the opening period of the fuel injector 9 at a constant duration while the start of the injection process is set at a predetermined point in the engine cycle. Any slowing of the engine thus results in the fuel injector 9 closing earlier in the engine cycle so that there is an increase in the average differential pressure across the injector 9, and therefore an increase in the fuel quantity injected as the engine slows. This provides a desirable "torque backup" to facilitate the subsequent acceleration of the engine 1 and also assists in maintaining a constant engine idle speed.

Figure 4:
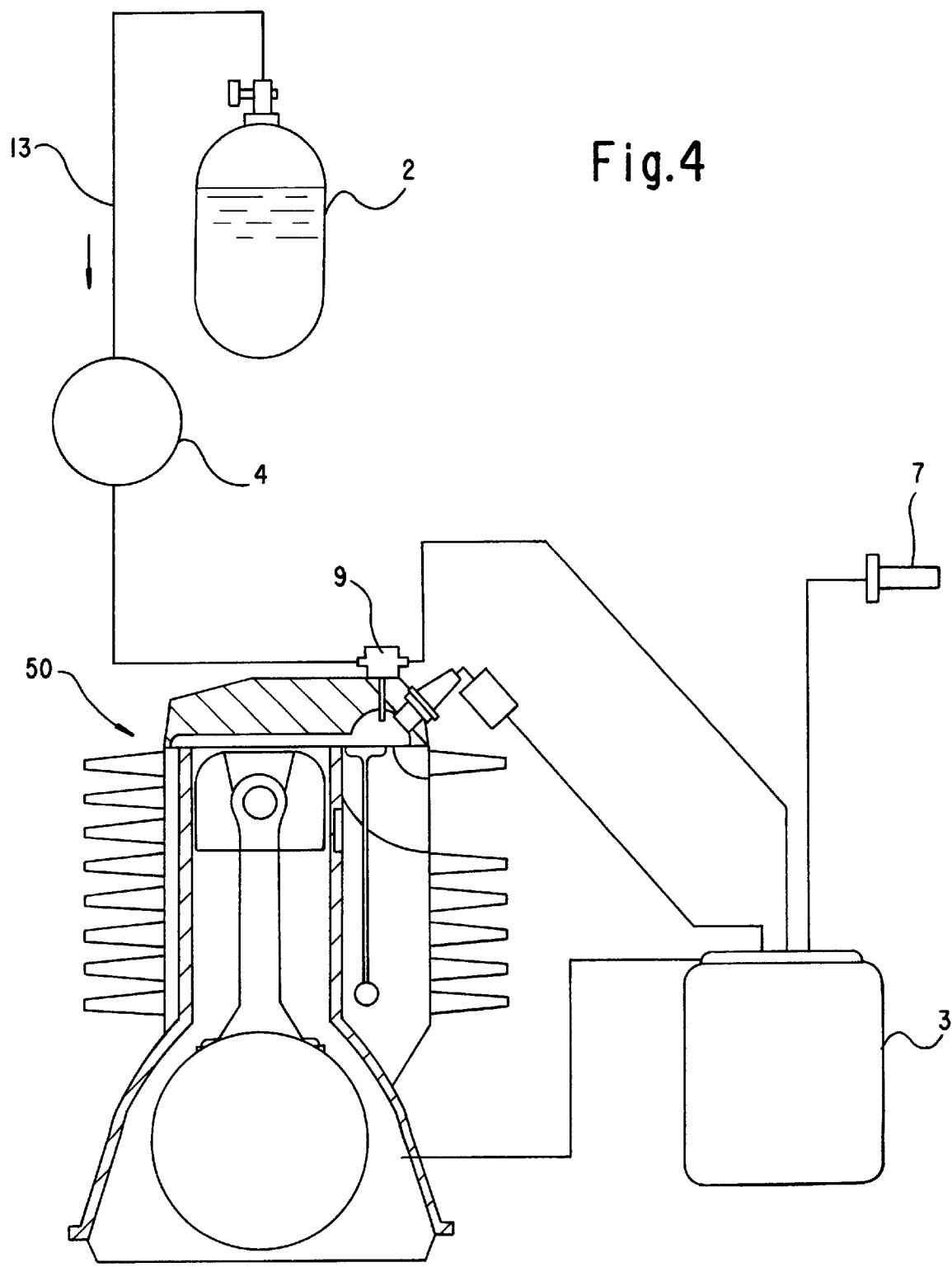
FIG. 4 is a schematic view of the gaseous fuel direct injection system according to the present invention used on a four stroke internal combustion engine.
Figure 5:
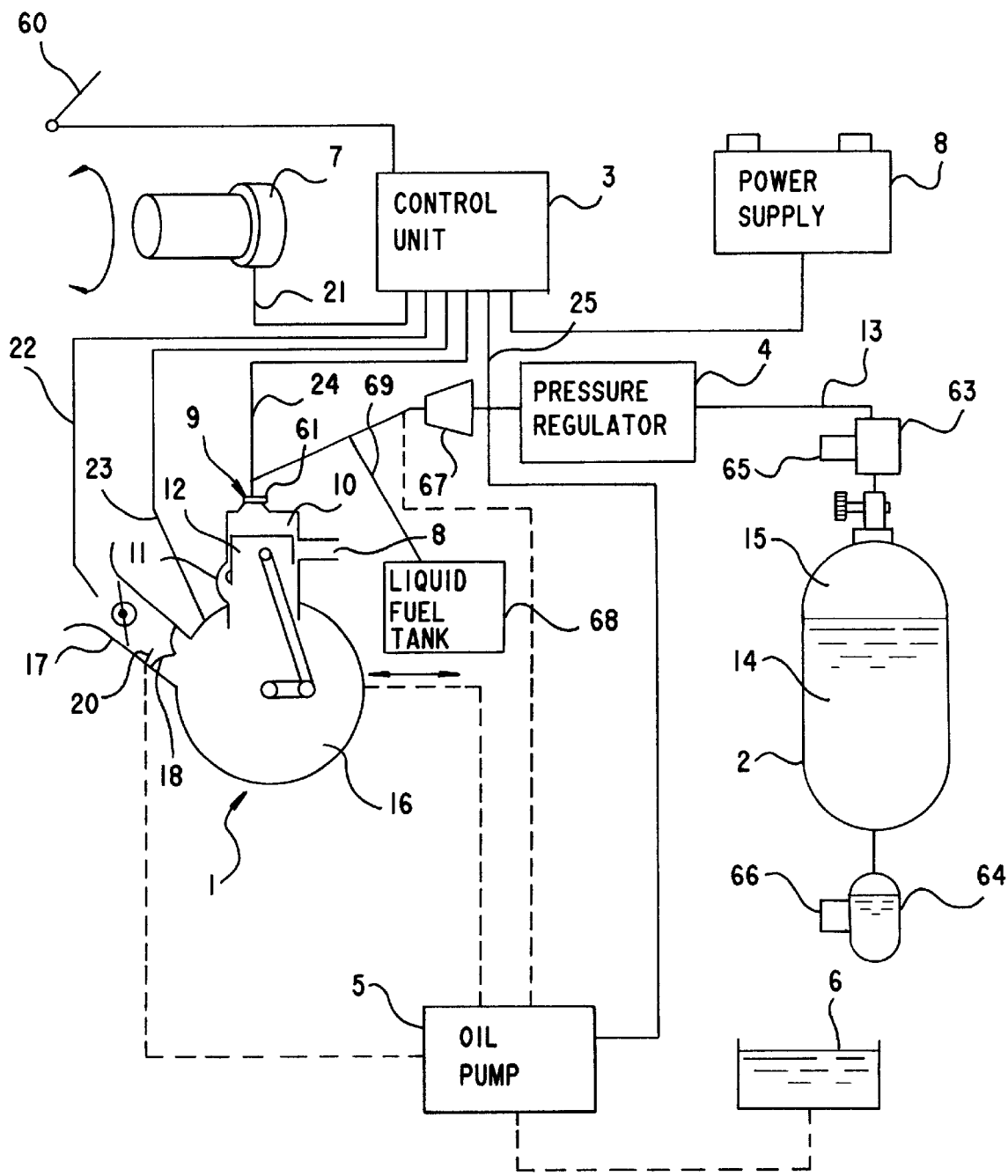
FIG. 5 is a schematic view of the fuel system of the present invention, showing the relationship of the gaseous fuel direct injection system, the internal combustion engine, and various accessories, including a control unit.

The gaseous fuel direct injection system according to the present invention is also applicable for four stroke internal combustion engines as shown in FIG. 4. Components of the fuel injection system of FIG. 4 corresponding to the components of the system of FIG. 1 are for convenience designated with the same reference numerals. The engine 50 shown in FIG. 4 is of the side-valve four stroke engine type. This is the type of engine may be used for example on lawnmower or stationary engine applications or any other application requiring a low cost engine.

We claim:

1. In a direct injection gaseous fuel system for a spark ignited internal combustion engine having an inlet port for admitting combustion air into a combustion chamber of the engine, the direct injection system including at least one fuel injector means and supply means for supplying said fuel to the fuel injector, the fuel injection means for directly injecting a quantity of fuel which is a compressed gas fuel or a liquified gas fuel into the combustion chamber, the improvement comprising said fuel injection means also for completing injection of said fuel before the compression stroke of the engine is substantially completed, and for, during at least some engine operating conditions, initiating injection of said fuel after the closing of the inlet port while controlling the quantity of gaseous fuel being injected into the combustion chamber as a function of both the timing and duration of the injection of the gaseous fuel.

2. A fuel system according to claim 1 including a control means for controlling the fuel injector, the fuel injector metering the quantity of gaseous fuel delivered to the combustion chamber.

3. A fuel system according to claim 2 wherein the control means controls the duration of opening of the fuel injector as a function of the operation load demand, the control means providing the required operating parameters for the fuel injector.

4. A fuel system according to claim 2 wherein the control means controls the duration of opening of the fuel injector as a function of the operator speed demand, the control means providing the required operating parameters for the fuel injector.

5. A fuel system according to claim 4 wherein the fuel injector is controlled according to a closed loop speed control strategy wherein the operation of the fuel injector is controlled as a function of at least the difference between an operator speed demand signal and the actual engine speed, the engine speed providing a feedback signal to the control means.

6. A fuel system according to claim 2 wherein the control means is adapted to control the differential pressure across the fuel injector between the supply pressure of the gaseous fuel and the pressure within the combustion chamber during the injection process.

7. A fuel system according to claim 6 wherein the operation of the fuel injector is controlled to provide a substantial difference in the differential pressure across the fuel injector between at least two different operating conditions of the engine.

8. A fuel injection system according to claim 2 wherein the control means is adapted to sense the delay time between the sending of a control signal from the control means to the fuel injector for opening the fuel injector and the actual sensed opening of the injector.

9. A fuel injection system according to claim 8 wherein the fuel injector is solenoid actuated, and the control means is adapted to sense the change in the current or voltage drawn by the injector to thereby determine the delay time.

10. A fuel injection system according to claim 2 wherein the control means is adapted to operate the engine such that a stratified fuel change is present in the combustion chamber prior to ignition.

11. A fuel injection system according to claim 1 wherein the gaseous fuel is liquefied petroleum gas (LPG).

12. A fuel injection system according to claim 1 including heating means for heating the gaseous fuel within a fuel tank.

13. A fuel injection system according to claim 12 wherein the fuel tank includes means for maximizing the surface to volume ratio of the fuel tank.

14. A fuel injection system according to claim 13 wherein said means includes fins provided on the exterior of the fuel tank.

15. A fuel injection system according to claim 12 wherein the heating means includes a relatively smaller auxiliary storage means connected to the fuel tank, and means for heating the auxiliary storage means.

16. A fuel injection system according to claim 12 including connection means between the fuel tank and the injector and means for heating the connection means.

17. A fuel injection system according to claim 1 wherein the injection process is limited to the engine cycle period between 180° BTDC and 45° BTDC.

18. A fuel injection system according to claim 1 wherein the gaseous fuel is stored under very high pressure conditions, and the regulation process for reducing the gaseous fuel pressure provides useful work for the operation of the engine.

19. A fuel injection system according to claim 18 further including a turbine means.

20. A fuel injection system according to claim 1 wherein the gaseous fuel direct injection system is part of a hybrid fuel system, the system alternating between gaseous and liquid fuels.

21. A fuel injection system according to claim 1 having control means for controlling a fueling level to the engine on the basis of a speed demand value.

22. A method for controlling a gaseous fuel direct injection system for a spark ignited internal combustion engine having an inlet port for admitting combustion air into a combustion chamber of the engine, the method comprising supplying a fuel which is compressed or liquified gaseous fuel to a fuel injector, and directly injecting a quantity of said fuel from the fuel injector into the combustion chamber, wherein the injection of the fuel into the combustion chamber is completed before the compression stroke of the engine is substantially completed, and wherein the injection of the fuel is initiated after the closing of the inlet port during at least some points when the engine is operating while controlling the quantity of gaseous fuel being injected into the combustion chamber as a function of both the timing and duration of the injection of the gaseous fuel.

23. A method according to claim 22 including metering the gaseous fuel delivered to the combustion chamber by altering the timing of the closing of the fuel injector relative to the engine cycle in the injection process.

24. A method according to claim 23 including maintaining the total duration of the opening of the fuel injector remains at least substantially constant.

25. A method according to claim 22 including completing the injection process after the pressure in the combustion chamber has risen significantly during the engine cycle.

26. A method according to claim 25 including completing the injection process after the inlet and exhaust ports of the combustion chamber have closed.

27. A method according to claim 22 including completing the injection process prior to any significant increase in the pressure within the combustion chamber associated with the compression stroke of the engine.

28. A method according to claim 22 wherein the time between initiation and completion of said fuel injection is limited to the period between 180° BTDC and 45° BTDC.

29. A method according to claim 22 when the engine is at idle, including initially opening the fuel injector at a predetermined point in the engine cycle, maintaining the duration of opening of the fuel injector at least substantially constant such that the closing of the fuel injector occurs after the pressure within the combustion chamber has begun to increase significantly.

30. A method according to claim 29 including closing the fuel injector after the inlet and exhaust ports of the combustion chamber are closed.

31. A method according to claim 22 including controlling the start up of the engine by selecting at least one combustion chamber for initial firing thereof, opening the fuel injector in the at least one combustion chamber in a predetermined manner, and firing a spark plug of said at least one combustion chamber in a predetermined manner to thereby cause the piston of the combustion chamber to travel through at least part of a power stroke thereof.

32. A direct injection gaseous fuel system for a spark ignited internal combustion engine, the direct injection system including at least one fuel injector means and supply means for supplying fuel which is compressed or liquified gaseous fuel to the fuel injector, the fuel injector means for directly injecting a quantity of fuel into the combustion chamber, by opening the fuel injector for a predetermined period of time, and wherein at least during some engine operating conditions the duration of the injection period is substantially fixed in the time domain and does not substantially alter in response to a given change in engine speed.

33. A direct injection gaseous fuel system for a spark ignited internal combustion engine having an inlet port for admitting combustion air into a combustion chamber of the engine, the direct injection system including at least one fuel injector means and supply means for supplying said fuel to the fuel injector, the fuel injection means for directly injecting a quantity of fuel which is a compressed gas fuel or a liquified gas fuel into the combustion chamber, wherein the injection of said fuel is initiated after the closing of the inlet port and is completed before the compression stroke of the engine is substantially completed.

34. A direct injection gaseous fuel system for a spark ignited internal combustion engine having an inlet port for admitting combustion air into a combustion chamber of the engine, the direct injection system including at least one fuel injector means and supply means for supplying said fuel to the fuel injector, the fuel injection means for directly injecting a quantity of fuel which is a compressed gas fuel or a liquified gas fuel into the combustion chamber in the form of a stratified charge, wherein the injection of said fuel is completed before the compression stroke of the engine is substantially completed, and wherein during at least some engine operating conditions the injection of said fuel is initiated after the closing of the inlet port.

35. A direct injection gaseous fuel system for a spark ignited internal combustion engine having an inlet port for admitting combustion air into a combustion chamber of the engine, the direct injection system including at least one fuel injector means and supply means for supplying said fuel to the fuel injector, the fuel injection means for directly injecting a quantity of fuel which is a compressed gas fuel or a liquified gas fuel into the combustion chamber, wherein the injection of said fuel is completed before the compression stroke of the engine is substantially completed, and wherein during at least some engine operating conditions the injection of said fuel is initiated after the closing of the inlet port.

\* \* \* \* \*